Patented Feb. 3, 1942

2,271,797

UNITED STATES PATENT OFFICE 2,271,797

METHOD OF TREATING ALCOHOLIC BEVERAGES

Worth C. Goss, Seattle, Wash.

No Drawing. Application January 29, 1940,
Serial No. 316,225

2 Claims. (Cl. 99—48)

This invention is a method of transferring chemical substances from one liquid to another, causing at the same time a removal of impurities.

The present method has for its chief purpose the improvement in flavor of whiskies, particularly Bourbon and rye whiskies, although the method is applicable to other alcoholic beverages which in their natural state tend to contain substances which irritate the throat. In my co-pending application for U. S. Letters Patent, Serial No. 312,942, I have described a method of removing those substances from alcoholic liquors which cause throat irritation, particularly in Bourbon and rye whiskies which have been aged in charred casks.

The present patent application sets forth a method which uses as its basis the prior method but which achieves an increase in the fine flavors in whiskies in addition to the removal of throat irritating substances.

This is accomplished in the following manner: As a specific example, I use as a sample a pint of four year old Bourbon whiskey which has been aged in a charred cask. This whiskey will be of a type which would be considered high quality liquor just as it is bottled when taken from the cask at the end of four years. However, this liquor and all similar liquors contain small quantities of throat irritating substances. Chemical tests indicate that these throat irritants are of three general classes. First, wood extractives such as Gallic acid; second, the substance furfural, sometimes called furfuraldehyde; and third, substances which would fall in the class of hydrocarbons probably of an unsaturated nature. This last group of substances tend to defy exact chemical analysis but their presence may be proven by an indirect method which is as follows: Oak char may be extracted with a strong alcoholic solution and the identical throat irritant produced which is present in four year old whiskey. It is a well known fact that uncalcined charcoal will contain as much as 22% hydrocarbon content. As was pointed out in my prior application for Letters Patent, the hydrocarbon content of the liquor, the furfural content and the Gallic acid content may be preferentially adsorbed by means of a special type and pore size of activated carbon. If a carbon is used which has a standard adsorption factor and the proper pore size, a measured quantity when shaken up with a measured quantity of liquor will entirely remove the throat irritating properties of the liquor with practically no removal of the desirable flavoring elements which give the liquor its characteristic taste and odor.

In carrying out the present method a pint of four year old Bourbon whiskey is shaken with 7 c. c. of 48 to 200 mesh activated carbon for a period of 7 minutes. This carbon is preferably prepared by taking gas mask carbon of 60 minutes chloropicrin service time (Chemical Warfare Service Test) prepared as described in application for U. S. Letters Patent to Worth C. Goss and O. P. M. Goss, Serial No. 214,534, made from Douglas fir sawdust; this carbon is ground up, passed through a 48 mesh sieve, retained on a 200 mesh sieve and thoroughly washed in pure water, then dried and used as above described. The pint of liquor after being so treated will be found to be completely free of any throat irritant. However, this pint of liquor, although an extremely palatable alcoholic beverage does not have as rich a flavor as the same liquor would have if it had been aged for sixteen years instead of four years. This deficiency in flavoring can be corrected in the following manner: 8 c. c. of a 48 to 200 mesh carbon are now shaken up with the pint of purified whiskey for a period of one hour. This carbon absorbs most of the flavor in the pint of whiskey, the 8 c. c. of carbon are filtered from the liquor after an hour and are added to a pint of the same type of liquor which has just been taken from the whiskey cask. This second pint of liquor is shaken gently for a period of fifteen minutes and the carbon then filtered out. This second pint of liquor will then be found to be equal in every way to the quality of whiskey which has been aged sixteen years. The explanation for this phenomenon is as follows: The first pint of whiskey had a primary carbon treatment to remove all throat irritants. It then was given a secondary carbon treatment to remove from it most of its fine flavor. This fine flavor was then transferred to the second pint of whiskey and the fine flavor imparted thereto by means of adsorption replacement in the carbon. In other words, the throat irritants in the second pint of whiskey displaced the flavor in the carbon into the liquor and the throat irritants were adsorbed and held firmly, thus the treatment eliminates the throat irritants and nearly doubles the rich flavor and odor, making for all practical purposes sixteen year old whiskey from four year old whiskey, with an elapsed time of about an hour and a quarter. The first pint of whiskey which is nearly without odor or whiskey taste still retains all of its color and may advantageously be mixed with a heavy-bodied whiskey to form a whiskey blend and the second quantity of whiskey which contain double flavor may be sold as the equivalent of a very fine old whiskey.

The above-described method of flavor transference is applicable to a large number of substances, for example, wines in particular, and a wide variety of extracted substances in general.

I claim:

1. The method of improving the taste and flavor of a low grade liquor, comprising placing a charge of activated carbon, previously impregnated with the desirable flavor and taste giving esters, in the liquor to be improved, and causing the dissipation of said esters into the treated liquor due to their displacement by impurities absorbed by the carbon from the treated liquor.

2. The method of improving the flavor and taste of a low grade liquor, comprising placing a charge of activated carbon in a liquor of selected high grade for absorption of desired flavor and taste giving esters from said liquor, then transferring the impregnated carbon to the liquor that is to be improved for the dissipation into that liquor of the absorbed esters due to displacement from the carbon by absorbed impurities.

WORTH C. GOSS.